United States Patent [19]

Turner et al.

[11] 4,112,762
[45] Sep. 12, 1978

[54] PROBE COVER GRIP AND RELEASE DEVICE

[75] Inventors: Robert Bruce Turner, Weymouth; Marvin Menzin, Lexington; Hugh A. Robinson, Wenham; Thomas S. Williams, Newtonville, all of Mass.

[73] Assignee: Johnson & Johnson, New Brunswick, N.J.

[21] Appl. No.: 681,348

[22] Filed: Apr. 28, 1976

[51] Int. Cl.² .......................... G01K 1/08; G01K 7/16
[52] U.S. Cl. .................................... 73/343 R; 206/306
[58] Field of Search ....... 73/343 R, 362 AR, 425.4 P, 73/425.6; 206/306

[56] References Cited
U.S. PATENT DOCUMENTS

| 3,500,280 | 3/1970 | Ensign | 206/306 X |
| 3,650,153 | 3/1972 | Schwab | 73/343 R |
| 3,732,734 | 5/1973 | Avakian | 73/425.6 |
| 3,738,173 | 6/1973 | Sato | 73/343 R |
| 3,832,669 | 8/1974 | Mueller et al. | 73/362 AR X |
| 3,929,018 | 12/1975 | Turner | 73/343 R |

*Primary Examiner*—Richard C. Queisser
*Assistant Examiner*—Joseph W. Roskos

[57] ABSTRACT

A probe member for use with a probe cover including a handle having a mounting member; and a probe element fixed to the mounting member; the probe element includes at least one stationary salient section having a sharp edge outwardly flared toward the handle for gradually dilating the end of the probe cover installed on the probe element and impaling the adjacent surface of the probe cover to hold the probe cover firmly in place and prevent its release.

7 Claims, 7 Drawing Figures

PROBE COVER GRIP AND RELEASE DEVICE

FIELD OF INVENTION

This invention relates to a probe member for use with a probe cover, and more particularly to such a probe member having a stationary impalement device for releasably securing a probe cover.

BACKGROUND OF INVENTION

Electronic thermometers typically use an electric probe member with probe covers that may be reusable or disposable. Thermometers used in the health care industry for taking patients' temperatures use disposable covers to prevent infection and reduce sterilization costs. Contemporarily there are in use a number of different devices for holding the cover on the probe member. Some of these devices, such as cams, springs, sliding members, and various other complex and active parts, are expensive, tend to wear out, and are not trouble-free. Other devices are relatively less complex but do not provide the tight reliable fit of probe cover to probe member required with certain thermometer systems. Release mechanisms used to strip the probe cover from the probe member are often similarly complex and have met with indifferent success. Often the probe covers require some special configuration, taper, or retaining portions for cooperation with gripping and release devices, and may require special flexibility characteristics.

In many contemporary probe devices the probe cover, when in place, is under a significant stress due either to strain induced in the cover itself as by stretching or to forces actively applied to the cover by springs or other active mechanisms. This creates a danger that an inadvertantly released cover, if near or aimed at a patient, could cause harm and embarrassment. This danger is compounded when, as is often the case, the same general motion is applied to install the cover as to release it.

SUMMARY OF INVENTION

It is therefore an object of this invention to provide an improved, extremely simple device for securing a probe cover on a probe member.

It is a further object of this invention to provide such a device which tightly and reliably, sealingly engages the probe cover with at least a portion of the probe member.

It is a further object of this invention to provide such a device which is easily and inexpensively made.

It is a further object of this invention to provide such a device which operates without moving parts to grip the probe cover.

It is a further object of this invention to provide such a gripping device which contrastingly enables quick and easy release of the probe cover upon proper actuation.

It is a further object of this invention to provide a simple and inexpensive release device which can upon proper manipulation quickly and easily strip the cover from the probe member.

It is a further object of this invention to provide a gripping device which securely holds the probe cover without imposing forces on it which can be a danger upon release.

It is a further object of this invention to provide a gripping and release device which requires different motions to operate.

It is a further object of this invention to provide a gripping and release device which is operable with an extremely simply configured probe cover.

It is a further object of this invention to provide a gripping and release device which does not require a probe cover having special flexibility characteristics.

It is a further object of this invention to provide a gripping and release device which is operable with a simple, cylindrical shaped probe cover.

The invention results from the realization that a device for securing a probe cover on a probe member may be simply and elegantly produced using one or more sharp, flared edges which dilate the end of a cover as it is installed on a probe member and rely on the resilience of the cover to exert a force inwardly and backwardly on the sharp edge to thereby impale the cover and tightly secure it on the probe member.

The invention features a probe member for use with a probe cover including a handle that has a mounting member. There is a probe element fixed to the mounting member. The probe element includes at least one stationary salient section having a sharp edge outwardly flared toward the handle for gradually dilating the end of a probe cover installed on the probe element and impaling the adjacent surface of the probe cover to hold the probe cover firmly in place and prevent its release.

In preferred embodiments the salient section has a thin cross section and the sharp edge is a knife edge. The salient section holds the probe cover in place with its tip sealingly engaged with the free end of the probe element. The probe element may include a first component fixed to the mounting member and a second component fixed to the first component such that the salient section is disposed on the second component proximate the mounting member. The handle may further include a release mechanism including a plunger slidably disposed on the mounting member and having an opening proximate the salient section which is larger than the portion of the probe element carrying the salient section, and smaller than the probe cover itself for bearing on the probe cover and stripping it from the salient section with depression of the plunger.

The probe cover gripping device, alone or in combination with the probe cover release device, is useful with electronic measuring systems for monitoring various parameters where use of a probe cover is desirable. In the preferred embodiment described herein, the electronic measuring system is an electronic thermometer system for measuring temperature.

DISCLOSURE OF PREFERRED EMBODIMENT

Other objects, features and advantages will occur from the following description of a preferred embodiment and the accompanying drawings, in which.

Figure 1:
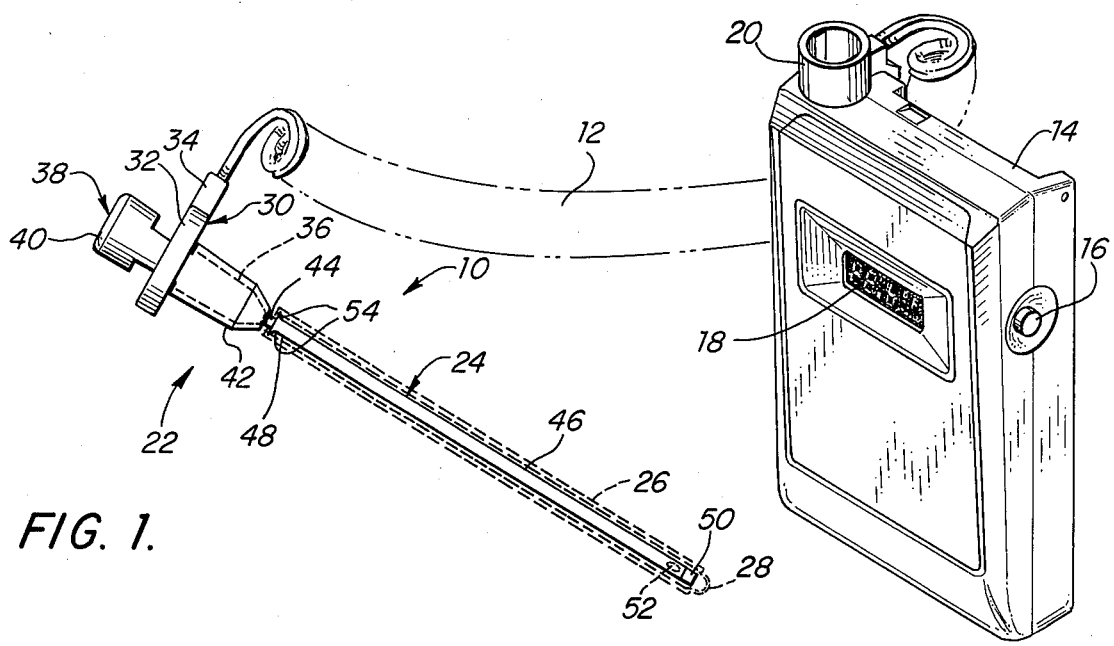
FIG. 1 is a diagrammatic plan view of a probe member embodying the gripping and release devices according to this invention connected to an electronic thermometer and engaged with a probe cover shown in phantom.

There is shown in FIG. 1 a probe member 10 interconnected by cable 12 to an electronic thermometer 14, having an operating switch 16, display 18, and a chamber 20 in which probe member 10 may be stored. The circuit used in thermometer 14 is that shown in U.S. Pat. No. 3,906,797, which is hereby incorporated. Probe member 10 includes a handle 22 and a probe element 24, which has been inserted in a probe cover, tube 26, having a metal tip 28. Tube 26 has a simple cylindrical shape with the usual flexibility characteristics of polyethylene or other similar plastic tubing. Handle 22 includes a mounting member 30 which includes disc 32 having an extension arm 34 which receives cable 12 and a tapered portion 36. Handle 22 also includes plunger 38, which includes cap 40 and tapered portion 42 which surrounds tapered portion 36 of mounting member 30. Probe element 24 includes a first component, tube 44, which is fixed to tapered portion 36, and a second component, tube 46, which receives and is fixed to, in its end 48, a portion of tube 44. The free end 50 of tube 46 contains a thermistor 52 or other transducer suited to sense the particular parameter being measured. In FIG. 1, tubes 44 and 46 are hollow tubes.

The device for gripping tube 26 includes one or more salient sections 54 which have sharp edges outwardly flared toward the handle 22.

Figure 2:
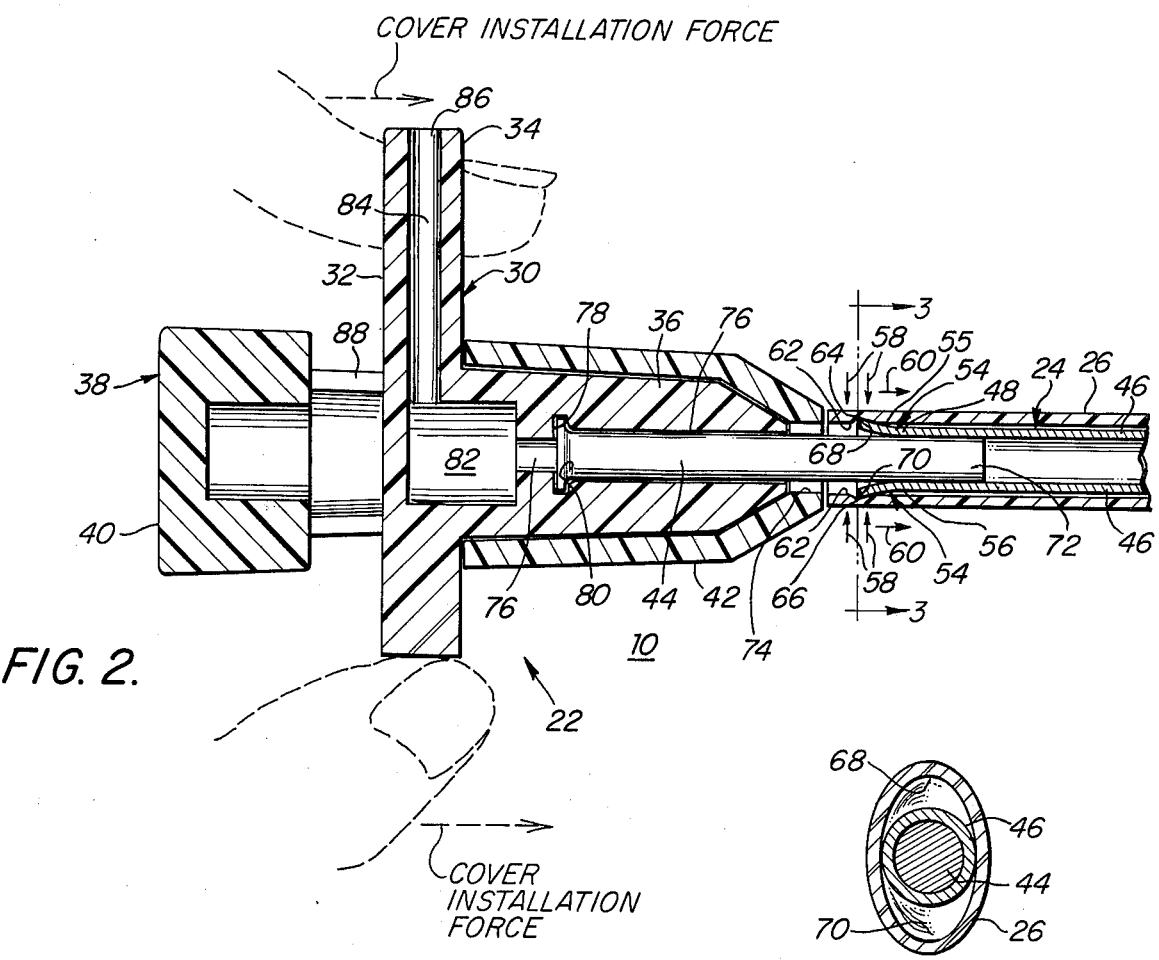
FIG. 2 is an enlarged sectional view of the handle of the probe member and a portion of the probe element with the probe cover in place showing both the gripping and releasing devices according to this invention.

Tube 26 is a resilient plastic material such as polyethylene which is dilated by the gradual action of the outwardly flared, FIG. 2, portions 55 and 56 of tube 46, upon the insertion of probe element 24. The radially inward forces, arrows 58, in combination with the longitudinal tensile forces, arrows 60, cause the inner surface 62 of tube 26 to become impaled at depressions 64, 66, by the sharp edges, essentially knife edges, 68 and 70. Edges 68 and 70 are effectively knife edges because of the thinness of the wall of tube 26, which is approximately ten thousandths of an inch thick.

Figure 4:
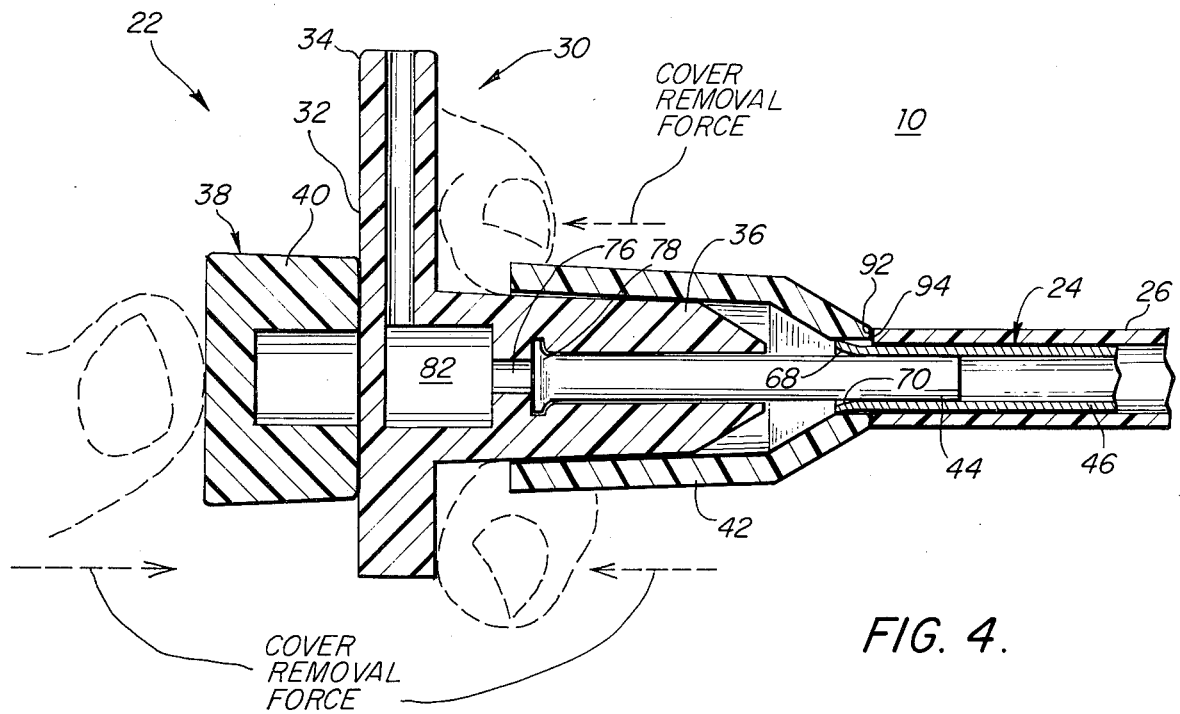
FIG. 4 is a view similar to FIG. 2 with the plunger depressed to operate the probe cover release device.

The longitudinal, arrows 60, and radial, arrows 58, forces, FIG. 1, are quite small and produce no bias sufficient to "pop," or "shoot," the cover off the probe. In fact even when plunger 38 is actuated to release the cover, tube 26, it typically only moves part way down probe element 24 and the removal is completed by gravity when probe element 24 is pointed downward. In addition, since the cover release motion is effected by placing two fingers beneath disc 32 about tapered portion 42 and pushing down on plunger 38 with the thumb, as illustrated in FIG. 4, while the cover installation motion is effected by gripping disc 32 between the thumb and forefinger and pushing down until the cover passes over and is impaled on edges 68, 70, as illustrated in FIG. 2, there is little likelihood of inadvertant release of a cover.

Tube 44 has one end 72 force-fitted within tube 46. The other end passes through hole 74 in the tapered portion 42 of plunger 38 and is fitted in bore 76 in tapered portion 36 of mounting member 30, where it is fixed by the close tolerance of bore 76 and the flared portion 78 of bore 76, which is fitted to the flared end 80 of tube 44. Bore 76 continues to a chamber 82, which in turn commmunicates with passage 84, which exits arm 34 at port 86. Cable 12 is routed through passage 84, chamber 82, bore 76, tube 44, and tube 46 to thermistor 52 at the free end 50 of probe element 24. Cap 40 and tapered portion 42 of plunger 38 are interconnected by semi-cylindrical members 88 and 90, only one of which, 88, is shown in FIG. 2, which are slidably accommodated in disc 32 of mounting member 30 as shown in detail in FIG. 7, thereby permitting plunger 38 to move longitudinally to and fro relative to mounting member 30 and probe element 24. Hole 74 in tapered portion 42 of plunger 38 has a larger corresponding dimension than tube 46 in the area of flared edges 68 and 70 but this dimension is smaller than at least the outer diameter of tube 26, in order to facilitate stripping tube 26 from edges 68 and 70 and removing it from probe element 24.

Figure 3:
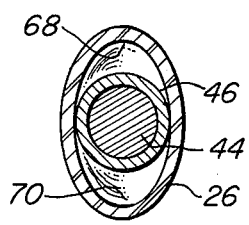
FIG. 3 is a sectional view taken along lines 3—3 of FIG. 2.

The cross section presented to hole 74 by tubes 44, 46, and edges 68 and 70, is shown in FIG. 3. When tube 26 is to be stripped from edges 68 and 70 and removed from probe element 24, plunger 38 is depressed, FIG. 4, so that cap 40 moves longitudinally inward until it contacts disc 32 of mounting member 30. This action causes tapered portion 42, interconnected with cap 40 by means of semi-cylindrical members 88 and 90 (member 90 not visible in FIG. 4) to move forward, to the right in FIG. 4 relative to tapered portion 36 so that the forward annular edge 92 of portion 36 comes in contact with the corresponding annular edge 94 of tube 26 and strips it from edges 68 and 70 so that it can be removed from probe element 24.

Figure 5:
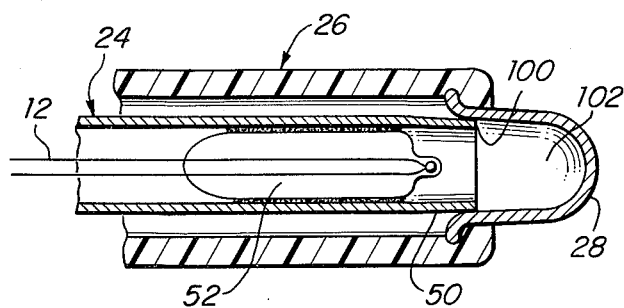
FIG. 5 is a diagrammatic cross-sectional view of the probe element illustrating the desired engagement between the free end of the probe element and the tip of the probe cover.

The tight, sealing engagement between the tip 28 of tube 26 and the free end 50 of probe element 24, achieved by the gripping device, including edges 68 and 70, of this invention, is illustrated in FIG. 5, where the tight seal at junction 100 between the inside of tip 28 and the outside of end 50 provides a buffer zone 102 that may be filled with a suitable heat transfer material such as air or any other medium depending upon the requirements of the parameters to be measured.

Figure 6:
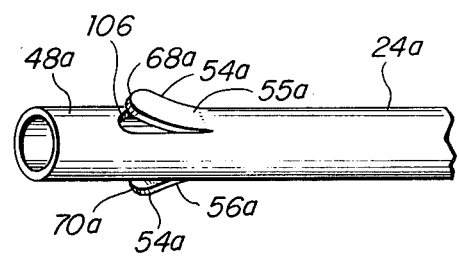
FIG. 6 is an axonometric view of a portion of the probe element which may be used with the probe member of FIG. 1, illustrating an alternative form of probe cover gripping device.

The gripping device of this invention is not limited to the provision of one or more flared surfaces 55 and 56 having sharp edges 68 and 70 located at the end 48 of a tube. For example, in FIG. 6, where like parts have been given like numbers accompanied by a lower case a, salient sections 54a are spaced from the end 48a of probe element 24a, and these sections have been formed from the tube leaving hole 106 and hole 108, not shown.

Figure 7:
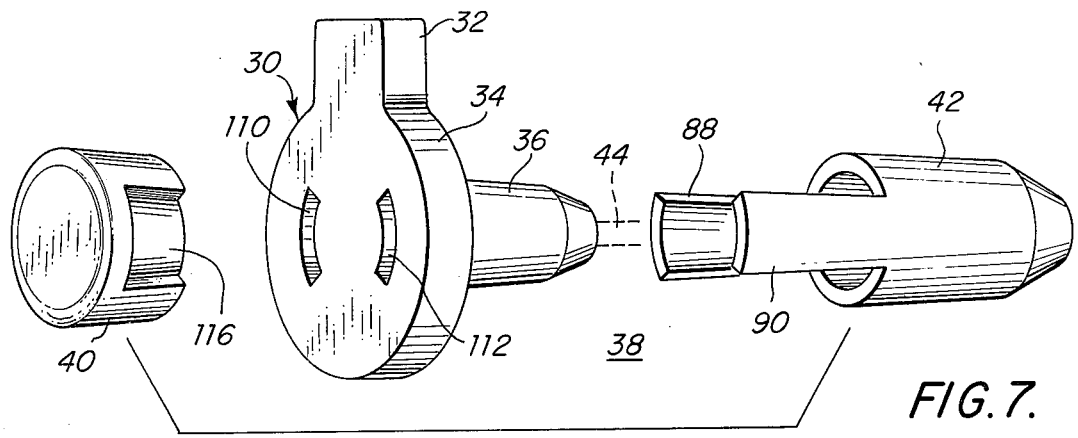
FIG. 7 is an exploded axonometric view of the mounting member, and tapered portion and cap of the plunger included in the handle.

Mounting member 30 includes a pair of semi-cylindrical passages 110 and 112, FIG. 7, in disc 32, which accommodate members 88 and 90, respectively, extending from tapered portion 42 of plunger 38 when tapered portion 42 is in position on tapered portion 36. When tapered portion 42 is in position on tapered portion 36 and members 88 and 90 extend through passages 110 and 112, cap 40 is positioned with members 88 and 90 terminating in recesses 114, not shown, and 116.

While the invention has been illustrated in connection with an electronic thermometer, it is suitable for use with other electronic measuring equipment or a probe used for any purpose that requires a simple but reliable gripping device for a probe cover. In addition, although the invention has been illustrated with a tubular probe element and tubular probe cover, this is not a necessary limitation of the invention as various other shapes for them are known and are within the scope of this invention.

Other embodiments will occur to those skilled in the art and are within the following claims:

What is claimed is:

1. In combination, a probe member and a disposable probe cover attachable thereto, said probe member having a handle and an elongated generally cylindrical metallic probe element depending outwardly therefrom, said probe element being deformed to define at least one integral, substantially rigid salient section flaring outwardly from a longitudinal axis of said probe element and towards said handle portion, said section terminating in a sharp edge, said probe cover being composed of a material deformable and penetrable relatively to the metallic material of said section, said handle portion including means for slidably inserting said probe element into said probe cover, said means for inserting forcing said probe cover to deform over said salient section and causing said sharp edge to inscribe itself fixedly into said probe cover, whereby said probe cover is rigidly mounted onto said probe member.

2. Apparatus as described in claim 1 wherein said handle portion further includes plunger means, slidably movable with respect to said means for inserting, for exerting removal force against said probe cover and against the sharp edge of said section, and for forcing said sharp edge to cut its way free of said probe cover.

3. The probe member of claim 2 in which said sharp edge is a knife edge.

4. The probe member of claim 3 in which said salient section holds said probe cover in place with its tip sealingly engaged with the free end of said probe element.

5. The probe member of claim 3 in which said salient section has a thin cross section.

6. Apparatus as described in claim 1 wherein said probe element includes a first tubular portion extending outwardly from said handle portion, and a second tubular portion connectably fit over the end of said first portion opposite said handle, said tubular portion being flared outwardly at its end fitting over said first portion.

7. Apparatus as described in claim 1 wherein said salient sections are formed as finned elements cut partially and bent outwardly from said probe element.

* * * * *